Aug. 5, 1930.    L. R. ZIFFERER    1,772,062
PIPE HANGER
Filed Aug. 10, 1927
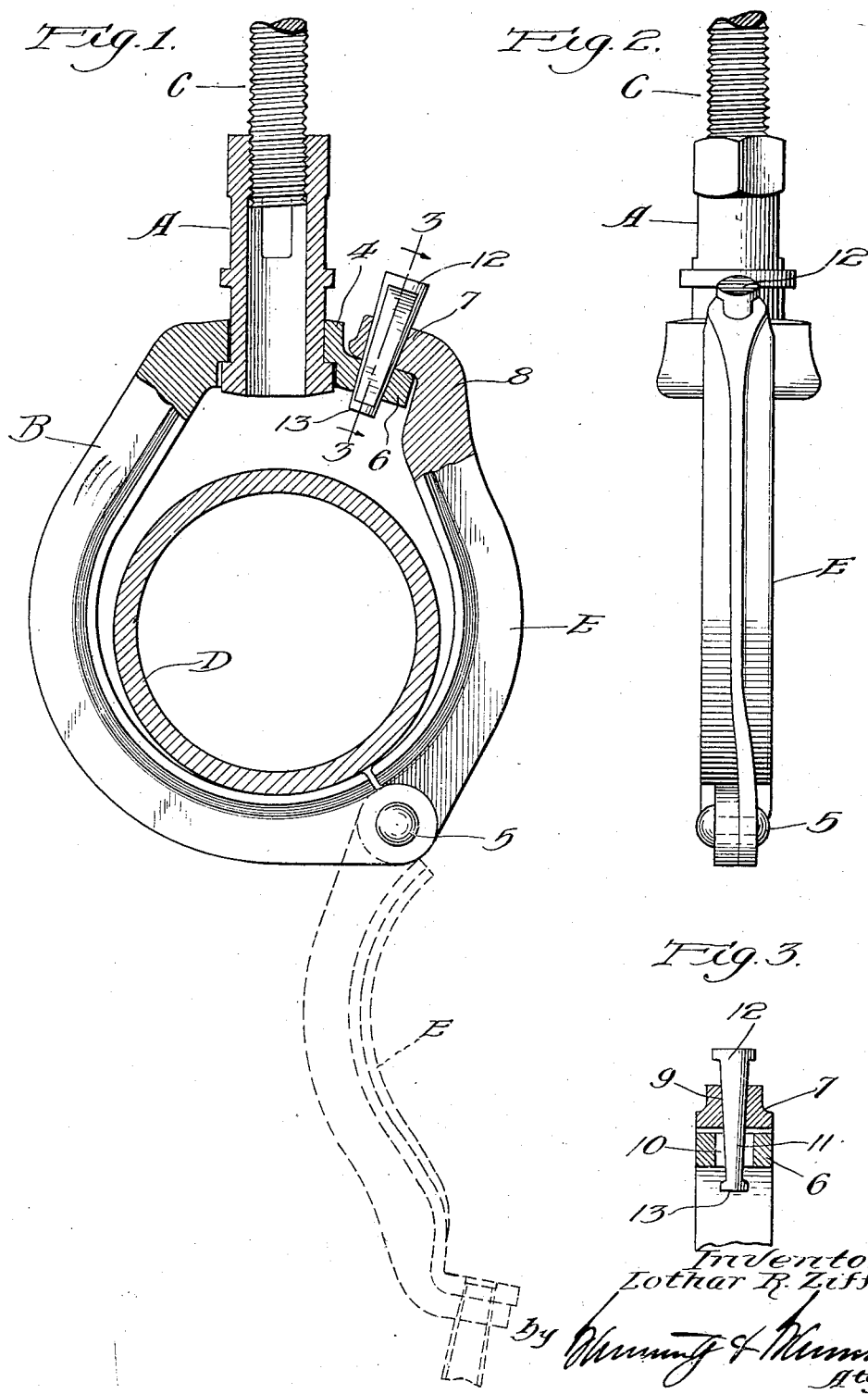

Patented Aug. 5, 1930

1,772,062

UNITED STATES PATENT OFFICE

LOTHAR R. ZIFFERER, OF COLUMBIA, PENNSYLVANIA

PIPE HANGER

Application filed August 10, 1927. Serial No. 211,909.

This invention relates to a pipe hanger of the type which employs a supporting ring having a pivoted arm with latch means for connecting it to the ring when a pipe is to be locked in place.

More particularly the present invention is directed to the latch means per se which is improved over previous constructions in several respects. It is sturdy, inexpensive, and self-acting, and consequently conduces to facility in the installation of a pipe.

A suggestive embodiment of this invention is set forth in the accompanying drawing in which—

Figure 1 is a view partly in section and partly in elevation of the hanger in its entirety;

Fig. 2 is an elevation of one edge thereof; and

Fig. 3 is a detail in section taken on line 3—3 of Fig. 1.

The hanger herein shown by way of illustration may comprise a sleeve A connected with a collar 4 which is formed on a pipe support B which, in its entirety, is in the general form of a ring. The sleeve is threaded for adjustable connection with a bolt or rod C having an overhead mounting by which to sustain the hanger and its load at a desired elevation. Within the hanger may be carried a pipe D which is movable into or out of position through an opening in the support adapted to be closed by an arm E pivoted thereto at 5 and provided at its free end with latch means the details of which will now be described.

Associated with the ring collar is a ledge 6 whereon may rest a head 7 which extends laterally from a neck 8 adjacent the free end of the arm E. This ledge forms a stop for the arm when the latter is moved to closed position. I form through the head 7 an opening 9 in register with a second opening 10 in the ledge. The walls defining the opening 9 are preferably tapered for the reception of a tapered pin 11 having heads 12 and 13 at opposite ends thereof. The opening 10 through the ledge is of sufficient size to receive the head 13 which passes therethrough when the pin slides to locking position, as shown in Figs. 1 and 3.

With the pipe hanger connected to a supporting rod or bolt C, the arm E may swing down, as indicated by dotted lines in Fig. 1, to receive a pipe which is movable laterally onto the ring support. In the down position of the arm the pin 11 also drops to the limit of its movement, the head 13 preventing it from falling out. Preferably the hole 9 is countersunk to accommodate the pin 13 in flush relation. When the arm is swung to up position, where its head 7 overlies the ledge 6, the pin shifts by gravity so as to enter the hole 10. With the parts so related, the arm is latched securely at its free end so as to lock the pipe within the hanger. If desired, the pin can be tapped on its head 12 to drive it with a wedge force against the tapered walls surrounding the hole 9, and if this be done the pin will resist any opposite movement except by the application of a considerable force for this purpose.

The construction herein described is exceedingly simple. The locking pin which forms the present latch is assembled in permanent relation with the pivoted arm, and acts in and by itself to slide into locking position whenever the arm is swung up to the limit of its movement.

I claim:

1. A hanger formed to provide a support open on one side to receive a pipe by a lateral movement, an arm pivoted to the hanger and adapted to swing from a down position to an up position to close the open side thereof, and latch means carried by the free end of the arm and movable to unlocking position when the arm is in down position and movable under the force of gravity when the arm is in up position to lock with the hanger to prevent down movement of the arm, substantially as described.

2. A hanger forming a support open on one side to receive a pipe by a lateral movement, an arm pivoted to the hanger for swinging movement in a vertical plane from a down position to an up position to close the open side of the hanger, and latch means freely movable mounted on the free end of the arm and movable to unlocking position when the arm is in down position and adapted when the arm is in up position to lock with the hanger for releasably securing the arm thereto, said latch means being movable under the influence of gravity in both positions of the swinging arm, substantially as described.

3. In a pipe hanger, the combination of a support which is open on one side to receive a pipe by a lateral movement, an arm pivoted to the support and adapted to swing into locking position adjacent one side of the pipe for connection at its free end with the hanger, the arm and hanger having apertured portions adapted to overlap when the arm is in said position, and a gravity-operated pin inseparably mounted within the arm aperture adapted to enter the hanger aperture when the arm is in locking position, substantially as described.

4. In a pipe hanger, the combination of a support open on one side for the reception of a pipe by a lateral movement, an arm pivoted at one end to the support and movable to a position adjacent the pipe, the hanger being provided with an apertured portion adjacent the free end of the arm, and a latch means carried by the arm adapted to enter the hanger aperture under the force of gravity when the arm is swung to locking position, substantially as described.

5. In a pipe hanger, the combination of a support which is open at one side for the reception of a pipe by a lateral movement, an arm pivoted at one end to the support and movable adjacent the pipe, there being an apertured portion on the hanger adjacent the free end of the arm, and locking means comprising a pin carried by the arm adjacent its free end and adapted when the latter is swung to proper position to be operated by gravity to enter the aperture of the hanger to secure the arm against movement relative thereto, the pin having means for limiting its range of movement within the arm and for remaining inseparably connected thereto, substantially as described.

6. In a pipe hanger, the combination of a support open at one side for the reception of a pipe by lateral movement, an arm pivoted at one end to the support and adapted to co-operate with the hanger to provide an enclosure around the pipe, and a gravity-actuated tapered latch means carried by the arm adjacent its free end adapted to co-operate with the hanger to lock the arm thereto, the latch means having a tapered surface adapted when forced to an advanced position to be held thereon by wedge action, substantially as described.

LOTHAR R. ZIFFERER.